United States Patent [19]

Gustafson

[11] 4,408,866

[45] Oct. 11, 1983

[54] RECEIVER SHEET TRANSPORT WITH ALIGNMENT MEANS

[75] Inventor: Gary B. Gustafson, Hilton, N.Y.

[73] Assignee: Eastman Kodak Company, Rochester, N.Y.

[21] Appl. No.: 353,779

[22] Filed: Mar. 1, 1982

[51] Int. Cl.³ .................... G03G 15/00; G03G 15/01
[52] U.S. Cl. .......................... 355/3 TR; 355/3 SH; 355/3 R; 355/14 TR; 355/4; 271/276
[58] Field of Search .......... 355/3 TR, 3 SH, 3 TE, 355/3 R, 4, 14 R, 14 TR, 14 SH; 271/82, 85, 90, 196, 152, 153, 204, 205, 275, 276, 277, 229, 231; 118/653, 621; 101/132; 430/126; 313/299

[56] References Cited

U.S. PATENT DOCUMENTS

| | | | |
|---|---|---|---|
| 3,460,472 | 8/1969 | Trumbull et al. | 101/132 |
| 3,533,618 | 10/1970 | Carstens | 271/276 |
| 3,633,543 | 1/1972 | Pitasi et al. | 118/621 |
| 3,879,121 | 4/1975 | Simpson | 355/3 R |
| 3,936,174 | 2/1976 | Carpenter | 355/3 R |
| 4,024,814 | 5/1977 | Becker | 271/276 X |
| 4,025,178 | 5/1977 | Yokozawa et al. | 355/3 R |
| 4,056,057 | 11/1977 | Smith | 271/276 X |
| 4,072,412 | 2/1978 | Suda et al. | 355/3 TR |
| 4,127,265 | 11/1978 | Wirz et al. | 271/277 X |
| 4,204,471 | 5/1980 | Becker | 271/277 X |
| 4,213,551 | 7/1980 | Windele | 355/3 TR X |
| 4,234,305 | 11/1980 | Miyake et al. | 355/3 SH X |

FOREIGN PATENT DOCUMENTS 914398 11/1972 Canada .
950933 7/1974 Canada .
1337123 11/1973 United Kingdom .
1368500 9/1974 United Kingdom .

*Primary Examiner*—A. C. Prescott
*Attorney, Agent, or Firm*—Lawrence P. Kessler

[57] ABSTRACT

An improved receiver sheet transport in apparatus for transferring related transferable marking particle images seriatim, from spaced areas on a member, onto a receiver sheet. The apparatus successively moves a receiver sheet into transfer relation with each of the related transferable images on the member. The receiver sheet is attached to the apparatus so that a portion of the receiver sheet intermediate the lead and trail edges is self-supporting. When such self-supporting portion of the receiver sheet is in transfer relation with the related transferable images on the member, transfer of such related images onto the receiver sheet in accurate superimposed register is effected. The apparatus includes a sheet positioning member, operatively associated with an area on the member, for positioning such lead edge of the receiver sheet relative to such area to accurately align the receiver sheet with such area during image transfer.

8 Claims, 6 Drawing Figures

RECEIVER SHEET TRANSPORT WITH ALIGNMENT MEANS

RELATED APPLICATIONS

This application is related to commonly assigned U.S. Patent application Ser. No. 353,778, filed on even date in the name of Gustafson et al, and U.S. Patent application Ser. No. 353,780 filed on even date in the name of Holzhauser et al.

BACKGROUND OF THE INVENTION

This invention relates in general to a receiver sheet transport for use in an electrographic copier, and more particularly to an improved transport for successively moving a receiver sheet into alignment with related transferrable marking particle images on a moving member for transfer of such images seriatim from the member to the aligned sheet in accurate superimposed register.

In making multicolor reproductions (copies) with a plain paper electrophotographic copier, for example, a multicolored original document is illuminated to provide color separation images of the original document. The color separation images expose a charged photoconductive member, at spaced image-receiving areas located along the member, to form latent image charge patterns corresponding to the respective color separation images. The latent image charge patterns are developed with appropriately colored marking particles (toner) to form transferrable images. The transferrable images are transferred from the photoconductive member to a receiver sheet in superimposed register to form a multicolor reproduction of the multicolor original.

In order to transfer the transferable images from the image-receiving areas to the receiver sheet in superimposed register, the receiver sheet is moved in a path to repetitively bring the sheet into transfer relation with the photoconductive member at a transfer station. In the aforementioned U.S. patent application Ser. No. 353,778, an apparatus is disclosed which includes a transport for successively moving a receiver sheet into transfer relation with related transferable images in image-receiving areas on the photoconductive member for accurate superimposed register of images transferred to the sheet. A corona transfer charger effects transfer of such images seriatim from the member onto such receiver sheet. The transport employs a tow bar having vacuum plenums for capturing the lead and trail edges of a receiver sheet so that a portion of such sheet intermediate the lead and trail edges is self-supporting. The tow bar does not block the field of the corona transfer charger during transfer, and the self-supporting portion of the receiver sheet conforms to the photoconductive member during transfer to prevent positional misregistration between subsequent images transferred to such sheet. The use of vacuum for capturing the lead edge, however, does not insure that the receiver sheet is in accurate alignment with the image-receiving areas of the photoconductive member. Accordingly, while the transferable images are transferred to the receiver sheet in accurate superimposed register, the resultant reproduction may not be properly positioned on the receiver sheet.

SUMMARY OF THE INVENTION

This invention is directed to an improved receiver sheet transport in apparatus for transferring related transferable marking particle images seriatim, from spaced areas on a member, onto a receiver sheet. The apparatus successively moves a receiver sheet into transfer relation with each of the related transferable images on the member. The receiver sheet is attached to the apparatus so that a portion of the receiver sheet intermediate the lead and trail edges is self-supporting. When such self-supporting portion of the receiver sheet is in transfer relation with the related transferable images on the member, transfer of such related images onto the receiver sheet in accurate superimposed register is effected. The apparatus includes a sheet positioning member, operatively associated with an area on the member, for positioning such lead edge of the receiver sheet relative to such area to accurately align the receiver sheet with such area during image transfer.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figures 1, 2:
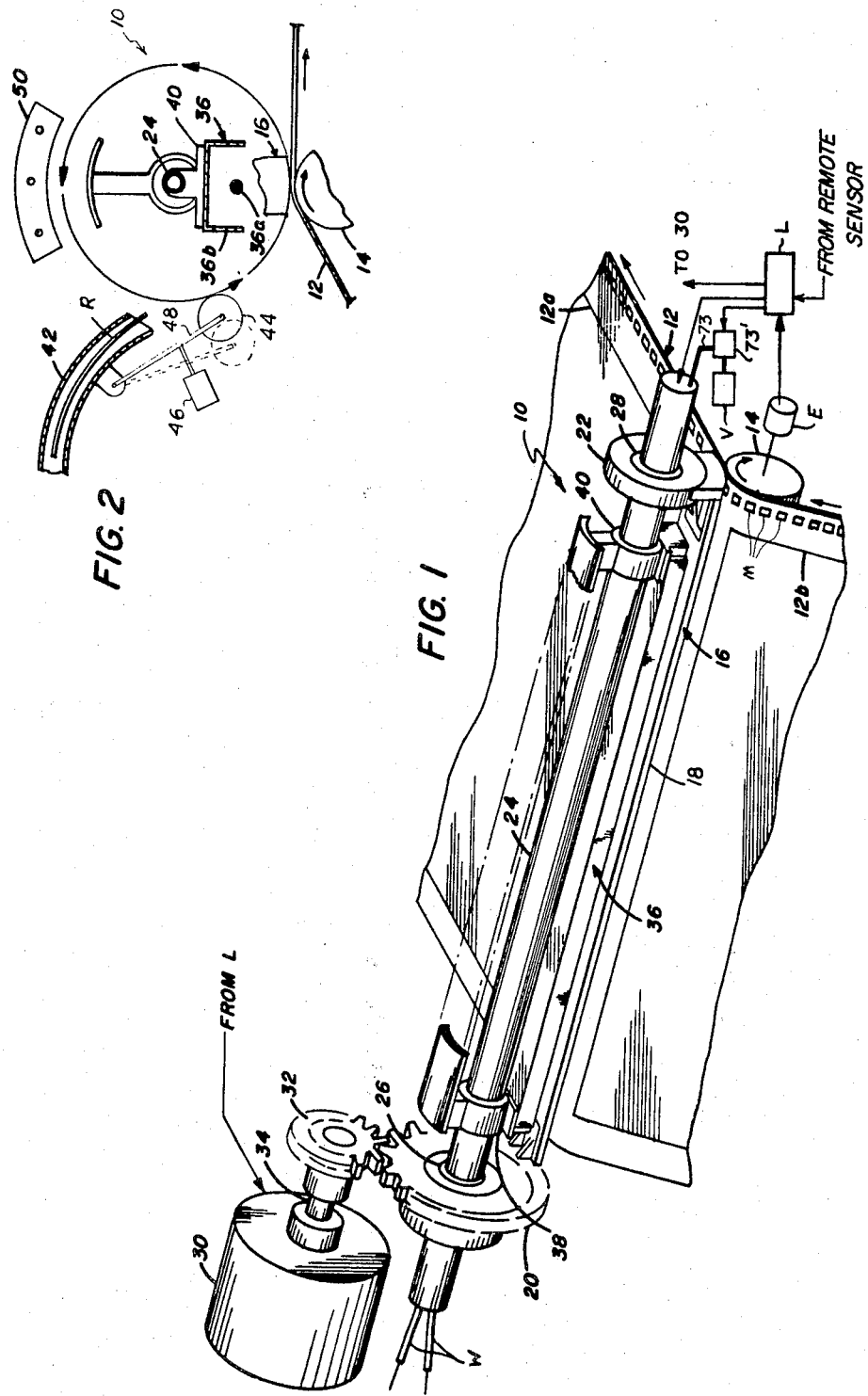
FIG. 1 is a view, in perspective, of an electrographic transfer apparatus, particularly showing an improved receiver sheet transport according to this invention, with portions being removed or broken away to facilitate viewing.
FIG. 2 is an end view, partially in cross-section of the apparatus of FIG. 1.

Referring now to the drawings, FIG. 1 shows a transfer apparatus 10 of an electrographic copier for transferring marking particle images from a moving member (web 12) to a receiver sheet. The apparatus is illustratively described with relation to a copier for making color reproductions formed by accurate transfer of superimposed related transferable images, corresponding to color separation images of input information from an image-carrying member to a receiver sheet. The accurate superimposed transfer of such related images, provided by the apparatus 10, is important for forming a faithful color reproduction. However, this invention is also be useful in an apparatus associated with a copier for making monochrome reproductions formed by transfer of related transferable images of a single color where accurate superimposed transfer is important.

In a copier apparatus of the electrophotographic type, the web 12 is, for example, a grounded photoconductive belt having sequentially spaced image-receiving areas (e.g. areas 12a, 12b of FIG. 1). Such belt is suitably of the type disclosed in U.S.Pat. No. 3,615,414, issued Oct. 26, 1971 in the name of Light. It is, of course, within the scope of this invention that the member could take the form of a photoconductive drum or a plurality of discrete sheets of photoconductive material. When a multicolor reproduction is to be made from multicolor input information, a uniform electrostatic charge on the web is selectively reduced in the image-receiving areas by exposure to related primary color separation images (red, green, blue) of such original multicolor input information, leaving latent image charge patterns in such areas respectively corresponding to the color separation images.

Exposure is, for example, effected by reflecting a light image from an original multicolor document through primary color filters to divide the image into color separation images. The color separation images are respectively projected to spaced image-receiving areas on the web. Alternatively, exposure is accomplished by electronically produced images, formed by light emitting diodes or fiber optic arrays, or by laser or flying spot scanners, directed at spaced image-receiving areas of the web. Of course, the invention is also useful with a web in the form of an insulating member having electrical charge induced electrostatic charge patterns, or a ferromagnetic member having magnetically produced patterns.

With the subtractive color reproduction process, the latent image charge patterns are respectively developed with complementary primary color (cyan, magenta, yellow) marking particles having an electrostatic charge opposite to that of the latent image charge patterns on the web 12 to form transferable images. Black marking particles are also useful for developing a latent image charge pattern corresponding to that portion of multicolor input information which is black.

The transfer apparatus 10 is located in juxtaposition with the web 12. The web, which travels about a closed loop travel path through electrographic processing stations, is supported adjacent to the transfer apparatus by roller 14. A sensor (not shown), remotely located relative to the roller 14, detects marks or perforations M (see FIG. 1) associated with the image-receiving areas on the web 12. The sensor produces signals in response to such detection. The signals are received by a logic and control unit L which includes, for example, an Intel 8080 microprocessor available from Intel Corporation of Sacramento, Calif. The unit L utilizes the signals to monitor the location of the image-receiving areas of the web 12 as the web travels about its path, and controls the timing of operation of the electrographic processing stations, based on the location of such areas, for forming transferble marking particle images on the areas. The unit L also controls the delivery of a receiver sheet, such as bond paper or transparency material, to the transfer apparatus 10 from a sheet supply (not shown). Such delivery is in timed relation to the travel of that image-receiving area of the web carrying the first of the related transferable images toward the transfer apparatus.

Figure 2A:
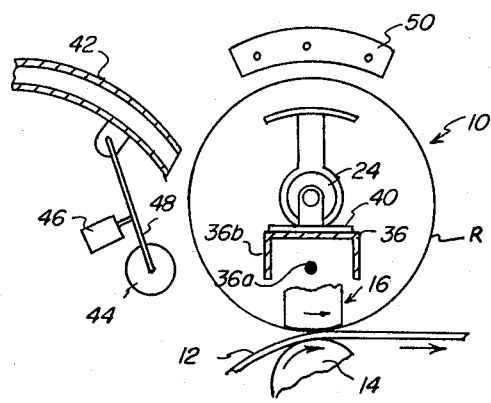
FIG. 2a is an end view, similar to FIG. 2, showing a receiver sheet captured by the improved transport according to this invention.

The transfer apparatus 10 is generally of the type disclosed in the aforementioned U.S. patent application Ser. No. 353,778, and is described herein only to the extent necessary for a complete understanding of the improved receiver sheet transport according to this invention. The transfer apparatus 10 includes a receiver sheet gripper 16 and a corona transfer charger 36 (see FIGS. 1, 2 and 2a). The gripper 16 comprises tow means in the form of a tow bar 18 which captures the lead and trail edges of a receiver sheet. The portion of the sheet intermediate the captured edges is self-supporting. A stationary hollow shaft 24 is located in spaced parallel relation to the plane of the photoconductive web 12 and perpendicular to the direction of travel of the web. A gear 20 and hub 22 are respectively journaled on the shaft 24 through bearings 26, 28. The tow bar is connected at one end to the gear 20 and at the opposite end to the hub 22 so as to be supported by the shaft 24 parallel to the longitudinal axis of the shaft. A stepper motor 30 has a gear 32 fixed on the output shaft 34 of the motor in mating engagement with gear 20. The stepper motor 30 is activated by the logic and control unit L to drive the tow bar 18 in stepped increments in a cicular path about the longitudinal axis of shaft 24. A receiver sheet captured by the tow bar 18 contacts the web 12 under the charger 36 as the tow bar is driven (see FIG. 2a).

The corona transfer charger 36 is mounted on the stationary shaft 24 by brackets 38, 40 in spaced parallel relation to the plane of the photoconductive web 12 and perpendicular to the web travel path. The charger 36 is, for example, of the type shown in U.S. Pat. No. 3,122,634 issued Feb. 25, 1964 in the name of king. The length of the charger is selected to span the dimension of the image-receiving area perpendicular to the web travel path. Wires W, connected to a DC or biased AC electrical potential source (not shown) pass through the shaft 24 and are connected to a corona wire 36a (see FIG. 2) of the charger 36 to generate a transfer corona. A shield 36b directs the corona at the area of contact between the captured receiver sheet and web 12. The electrical potential source applies a potential source to the corona wire 36a to charge the receiver sheet. The charge on the sheet is of the same polarity but substantially greater absolute value than the charge on the web attracting the marking particles to the web. Accordingly, the transfer corona is effective to overcome such attraction and transfer a marking particle image line-by-line from the moving web to the moving receiver sheet during the time the sheet is in contact with the web.

Figure 4:
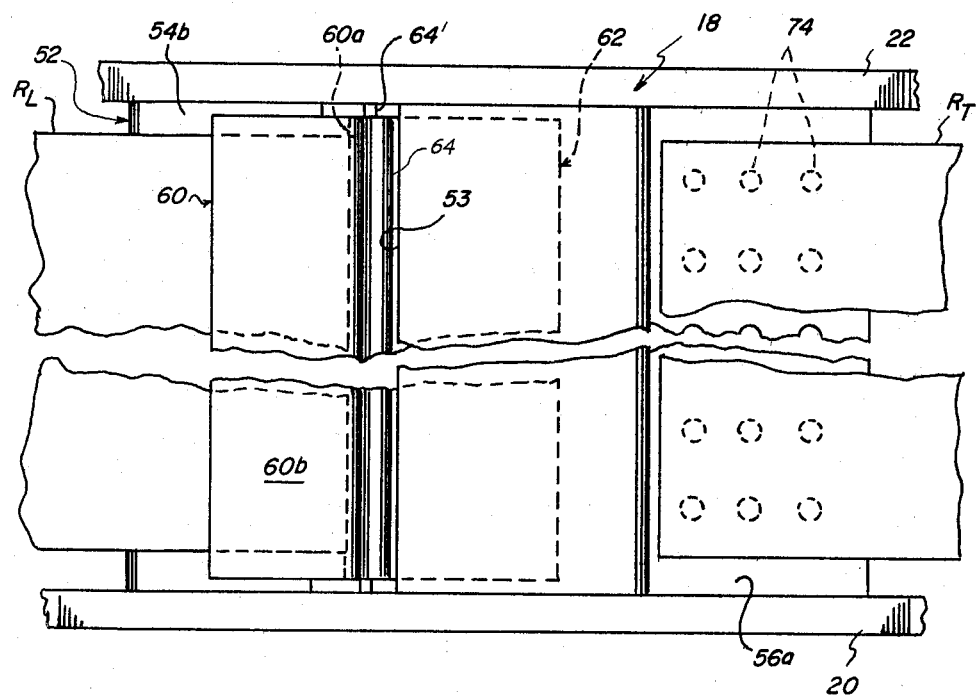
FIG. 4 is a bottom view, of the portion of the apparatus of FIG. 3, taken along lines 4—4 of FIG. 3.
Figure 3:
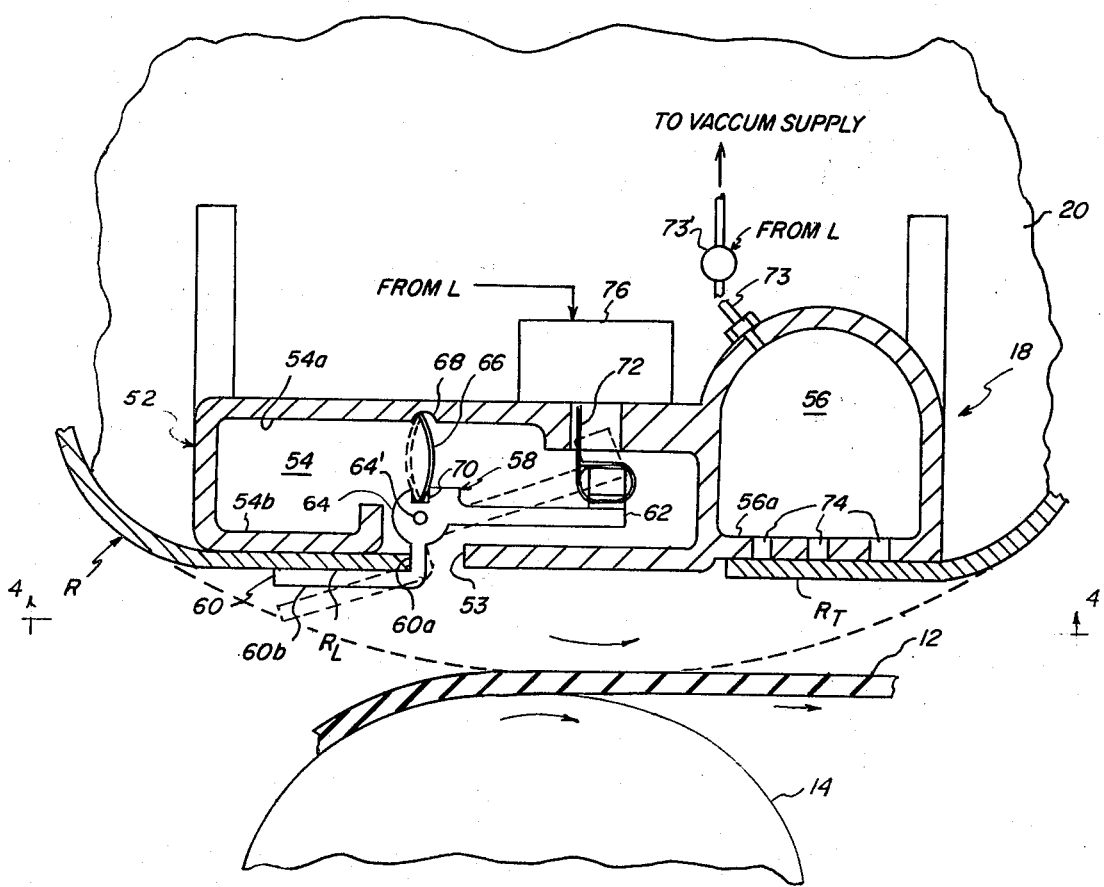
FIG. 3 is an end view, in cross-section and on an enlarged scale, of a portion of the apparatus of FIG. 1.

The tow bar 18 includes a housing 52 (see FIGS. 3 and 4) extending between the gear 20 and hub 22. The housing has first and second internal chambers 54, 56. A mechanically actuated receiver sheet engaging clamp 58 has a hub 64 pivotally mounted on a pivot pin 64'. The pin 64' is supported by the housing 52 and passes through the chamber 54. The clamp 58 is movable about the pin between a receiver sheet clamping position (solid line position in FIG. 3) and a release position (broken line position in FIG. 3, or FIG. 5). The clamp 58 includes a receiver sheet positioning member 60 and a release arm 62, both connected to the hub 64. The member 60 has a lead edge engaging portion 60a and an elongated portion 60b. The portion 60a extends radially outwardly from the hub 64 through an opening 53 in the wall 54b of the housing 52. Such portion is transverse to the direction of travel of the web 12 and parallel to a lead edge of an image-receiving area on the web in the web travel direction. The elongated portion 60b extends in a direction across the path of a receiver sheet and overlies a portion of the outer surface of the wall 54b. The release arm 62 is coupled by a retractable cable 72 to a solenoid 76 mounted on the housing 52. The solenoid 76 is operatively connected to the logic and control unit L to receive actuating signals from such unit. A snap action spring 66 is mounted at one end in a groove 68 in the upper wall 54a of the chamber 54, and at the other end in a groove 70 in the hub 64. When the clamp 58 is in its clamping position, the spring 66 is in its solid line position of FIG. 3 and maintains the clamp in such position, firmly clamping the receiver sheet between the portion 60b of the member 60 and the outer surface of the wall 54b; and conversely, when the clamp is in its release position, the spring is in its broken line position of FIG. 3 and maintains the clamp in such position freeing the receiver sheet from clamped engagement (see FIG. 5).

The second chamber 56 is connected to a vacuum source V by a conduit 73, extending outwardly from the hollow shaft 24 (see FIG. 1). The application of vacuum from the source V to the chamber 56 is controlled by a valve 73'. The valve 73' is operatively connected to the logic and control unit L to receive actuating signals from such unit. A wall 56a of the chamber 56 has a plurality of ports 74 extending therethrough. When vacuum is applied to the chamber 56, it is effective through the ports 74 to tack the trail edge of a receiver sheet to the outer surface of the wall 56a. The walls 56a and 54b lie substantially on a chord of the circular path described by rotation of the tow bar 18. The chord is selected such that the finger 60 lies in the segment area formed by the chord (see FIG. 3). Accordingly, when the tow bar is adjacent to the web 12, the finger 60 is spaced from the web so that the finger does not contact the web.

A receiver sheet (e.g. sheet R) is transported toward the gripper 16 through a guide 42 (see FIG. 2). The logic and control unit L actuates the stepper motor 30 to drive the tow bar 18 such that at substantially the same time as the lead edge $R_L$ of the receiver sheet intersects the path of the tow bar (rotated counterclockwise in FIG. 2), the tow bar arrives at the point of intersection. When the tow bar 18 arrives at the point of intersection with the receiver sheet, the clamp 58 is in its release position so as to readily accept the lead edge $R_L$ of such sheet. The speed at which the receiver sheet is transported through the guide 42 is greater than the tangential velocity of the tow bar 18. Therefore, the lead edge $R_L$ is forced into engagement with the portion 60a of the member 60, and the sheet positively registers itself against such portion. Since the portion 60a is parallel to the lead edge of an image-receiving area of the web 12, any skew which may have resulted during transport is removed.

A plurality of rollers 44 are supported by a plurality of pivoting arms 48 (only one shown in FIG. 2) adjacent to the transfer apparatus 10 across the path of travel of the receiver sheet. A solenoid 46, connected to pivoting arm 48, is actuated by the logic and control unit L to move the rollers to the solid line position of FIG. 2 (immediately downstream of the point of intersection between the sheet and the tow bar path) substantially simultaneously with the arrival of the tow bar 18 at such point of intersection. In such position, the rollers 44 are in the path of the member 60 so that, as the tow bar is driven, the rollers engage the member to move the clamp 58 to its clamping position. As the clamp is moved, the elogated portion 60b of the member 60 securely clamps the aligned receiver sheet between such portion and the outer surface of the wall 54b, and the spring 66 snaps to its solid line position to hold the clamp in such position. After the receiver sheet is secured to the tow bar 18, the solenoid 46 returns the rollers 44 to the broken line position of FIG. 2 out of the path of the member 60.

Movement of the tow bar 18 about its path tows the captured receiver sheet about such path. The logic and control unit L controls actuation of the stepper motor 30 to drive the tow bar in timed relation to movement of the web 12 so that portion 60a of member 60 and the lead edge of an image-receiving area of the web arrive under the charger 36 simultaneously. The receiver sheet, with its lead edge in engagement with portion 60a, is thus accurately aligned with the image-receiving area of the web. Thus when that portion of the receiver sheet adjacent to the lead edge $R_L$ is brought into engagement with the web 12, such portion and the first transferable marking particle image in an image-receiving area on the web arrive under the transfer corona charger 36 in register for transfer of such image to the receiver sheet. The dimension of the captured portion of the sheet is selected to fall in the margin area of the image-receiving area. Since no information is contained in the margin area, no information is lost during transfer. Continued movement of the tow bar 18 about its path carries the lead edge of the receiver sheet away from the web. However, the normal beam strength of the receiver sheet and electrostatic forces between the sheet and the grounded web 12 cause following successive elements of the sheet to contact the web under the charger 36. The corona charge is not blocked by the tow bar 18 and thus effectively acts on the sheet, which is substanially free to conform to the web at the area of contact, to efficiently transfer a marking particle image to the sheet. Since the receiver sheet is accurately aligned with the image-receiving area, transfer of the image from such area to the sheet is accomplished in register (i.e. properly positioned) relative to such sheet.

The tangential velocity of the tow bar 18 is controlled by the stepper motor 30 so that its peripheral speed substantially matches the speed of the web 12. Therefore there is no relative movement between the sheet and the transferable image on the web during contact so that smearing during transfer is prevented. The linear distance of the circular path of the tow bar 18 is selected to exactly match the linear dimension of an image-receiving area on the web 12 plus the distance between image-receiving areas (interframe area) in direction of web travel. Accordingly, when the receiver sheet R is returned to engagement with the web, it is in register with the next image-receiving area on the web. As the receiver sheet traverses its path under the influence of the tow bar 18, it passes an AC charger 50 (see FIG. 2) which provides a neutralizing charge to remove charge on the sheet in order to facilitate subsequent transfers induced by the charger 36.

A shaft encoder E is operatively associated with the web support roller 14 (see FIG. 1). The encoder produces signals indicative of the angular position of the roller 14 due to movement of the web 12. Such signals are fed to the logic and control unit L where they are compared with the monitored location of an image-receiving area of the web. Such comparison is used to determine whether a particular image-receiving area will reach the transfer station at the proper time relative to the arrival of a captured receiver sheet. If there is any positional deviation between the image-receiving area and the receiver sheet, which would result in a non-registered transfer, the logic and control unit L adjusts the action of the stepper motor 30 during the passage of the interframe area beneath the charger 36 to eliminate such deviation. Such adjustment comprises adding or subtracting steps relative to a predetermined number of steps which are normally required for proper positioning of the receiver sheet relative to the image-receiving area. By such adjustment such relative movement between the receiver sheet and the web occurs during passage of the interframe area under the charger so that there is no image smearing, as would occur if such adjustment occurred during image transfer.

Immediately prior to the tow bar 18 completing its first revolution about its circular path, the trail edge $R_T$ of the receiver sheet is brought into contact with the web 12. Concurrently, the lead edge of wall 56a of tow bar chamber 56 contacts the trail edge of the receiver sheet. At such time, the control unit L opens valve 73' enabling vacuum from the source V to be applied to the chamber 56. The vacuum is effective through ports 74 to capture the trail edge $R_T$ and tack such edge to the wall 56a. A particular advantage to using vacuum to capture the trail edge of the receiver sheet is that (within limits) variation in sheet size can be accomodated without losing control of the trail edge or requiring adjustment of the trail edge capture mechanism.

After the trail edge of the receiver sheet is captured, rotation of the tow bar 18 is continued a number of times corresponding to the number of related transferable images remaining on the web 12. With the lead and trail edges of the receiver sheet captured by the tow bar 18, the intermediate portion forms a self-supporting compliant loop which is maintained by the beam strength of the sheet. Thus, successive elements of the loop conformably contact the area of the web under the transfer corona 36 during each of the subsequent transfers of related transferable images, through the next-to-last transfer. During tow bar rotation, power is maintained to the corona charger 36 to effect transfer of the transferable images seriatim from the web to the sheet.

Figure 5:
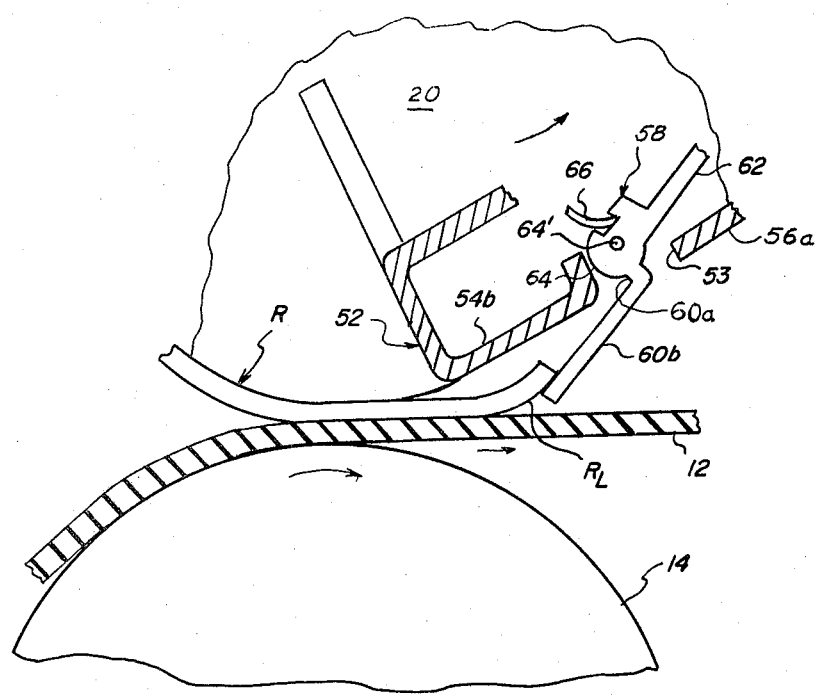
FIG. 5 is an end view of a portion of the apparatus of FIG. 3, shown in a receiver sheet release position.

When the tow bar 18 returns the receiver sheet R into contact with the web W to initiate transfer of the last related transferable image, the lead edge $R_L$ of the receiver sheet is released (see FIG. 5). To effect such release, logic and control unit L actuates solenoid 76 to retract cable 72. The cable moves the clamp 58 ot its release position, thus unclamping the receiver sheet from the surface 54b. The spring 66 snaps to its broken line position of FIG. 3 for holding the clamp in its release position, ready to receive another receiver sheet. Since the electrostatic forces effecting transfer tack the receiver sheet to the web 12, when the receiver sheet is released, the sheet separates from the tow bar 18 and follows the web toward a downstream location. As is the case during the first image transfer, the normal beam strength of the receiver sheet and the electrostatic forces between the sheet and the grounded web cause following successive elements of the sheet to conform to the web at the area of contact under the charger with the sheet traveling at a speed equal to that of the web. Transfer of the last related transferable image is accordingly accomplished in accurate superimposed register without smearing.

In response to completion of the last transfer, the logic and control unit L closes the valve 73' to interrupt application of vacuum to chamber 56. The trail edge $R_T$ of the receiver sheet R is thus released so that the sheet follows the web toward the downstream location. At such downstream location, the receiver sheet is detacked from the web and transported to a fuser (not shown) to permanently fix the superimposed transferred images to the sheet. Of course, if the vacuum force holding the trail edge to the wall 56a is set at such a level that movement of the receiver sheet with the web can strip the trail edge from the wall, interruption of the vacuum application would not be required. It should also be noted that if the interframe dimension beneath transferable images on the web is large, the receiver sheet trail edge gripping mechanism would have to be appropriately spaced from the lead edge clamping mechanism. For example, separate housings could be provided at locations spaced along the circular path described by the tow bar. Such spacings measured from the trail edge to the lead edge of the receiver sheet is equal to the interframe dimension. Since the receiver sheet has been aligned with the web by portion 60a of the clamp 58, the resultant reproduction is not only formed of accurately superimposed transferred images, but is also properly positioned on the receiver sheet.

The invention has been described in detail with particular reference to a preferred embodiment thereof, but it will be understood that variations and modifications can be effected within the spirit and scope of the invention.

I claim:

1. In apparatus for transferring related transferable marking particle images seriatim, from spaced areas on a member onto a receiver sheet, such apparatus including tow means for successively moving a receiver sheet into transfer relation with each of the related transferable images on the member, said tow means being adapted to capture the lead and trail edges of a receiver sheet so that a portion of the receiver sheet intermediate the lead and trail edges is self-supporting, and means for effecting transfer of such related images to the self-supporting portion of such receiver sheet in accurate superimposed register when such self-supporting portion is in transfer relation with the related transferable images on the member, the improvement wherein:

said tow means includes means operatively associated with an area on the member for positioning such lead edge relative to such area, to accurately align the receiver sheet with such area during image transfer.

2. The invention of claim 1 wherein said positioning means includes a positioning member pivotally connected to said tow means for movement between a first position and a second position, said positioning member in said first position being located for engagement by a receiver sheet lead edge, and when in said second position, clamping an aligned receiver sheet to said tow means.

3. The invention of claim 2 wherein said positioning means further includes means for selectively urging said positioning member into said respective positions.

4. The invention of claim 3 wherein said urging means includes a snap action spring to resiliently maintain said positioning member in its respective positions.

5. The invention of claim 1 wherein said tow means further includes a housing defining a vacuum chamber having a plurality of flow communicating ports engageable with the trail edge of a receiver sheet, said chamber being spaced from said positioning means, in an upstream direction, a distance substantially equal to the corresponding dimension of one of said areas on the member; whereby with vacuum applied to said chamber, the trail edge of such receiver sheet is tacked to said housing.

6. For use in apparatus having means for transferring related transferable marking particle images seriatim, from spaced areas on a moving member, onto a receiver sheet, an improved receiver sheet transport comprising:

tow means, to which a receiver sheet is attachable so that a portion of such sheet intermediate the lead and trail edge thereof is self-supporting;

means for moving said tow means in synchronism with said moving member to successively move the self-supporting portion of a receiver sheet into registered image transfer relation with such spaced areas adjacent to said transferring means;

means for positioning and clamping the lead edge of a receiver sheet against said tow means, said positioning and clamping means including a member, operatively associated with an area on the moving member, for positioning a receiver sheet lead edge relative to a lead edge of such area, said positioning member being pivotally supported by said tow means, for movement to a first position or to a second position, and having a portion overlying a portion of said tow means; whereby said positioning member, when in said first position and engaged by a receiver sheet lead edge, accurately aligns such lead edge with such lead edge of said area on the moving member, and when in said second position, said overlying portion of said positioning member clamps such aligned receiver sheet between such portion and said portion of said tow means for movement into aligned and registered image transfer relation with the related images on the moving member; and actuating means for moving said sheet engaging means from its first position to its second position after a receiver sheet lead edge engages said positioning member.

7. The invention of claim 6 wherein said positioning and clamping means further includes means for selectively urging said positioning member into said respective positions.

8. The invention of claim 6 wherein said actuating means includes first means engageable with such overlying portion of said positioning member for moving said sheet engaging means to its second position, and second means operatively associated with said positioning and clamping means for moving such means to its first position.

* * * * *